US010759606B2

(12) United States Patent
Cornelissen et al.

(10) Patent No.: US 10,759,606 B2
(45) Date of Patent: Sep. 1, 2020

(54) MODULAR CONVEYOR, CONVEYOR MODULE AND METHOD OF COUPLING MODULES OF A CONVEYOR

(71) Applicants: REXNORD FLATTOP EUROPE B.V., s-Gravenzande (NL); REXNORD FLATTOP EUROPE S.R.L., Correggio (RE) (IT)

(72) Inventors: Leonardus Adrianus Catharinus Cornelissen, The Hague (NL); Cornelis Hendrik Mijndert Menke, The Hague (NL); Andrea Andreoli, Modena (IT); Guido Marchiani, Reggio Emilia (IT)

(73) Assignees: REXNORD FLATTOP EUROPE B.V., 'S-Gravenzande (NL); REXNORD FLATTOP EUROPE S.R.L., Correggio (RE) (IT)

( * ) Notice: Subject to any disclaimer, the term of this patent is extended or adjusted under 35 U.S.C. 154(b) by 0 days.

(21) Appl. No.: 16/317,767

(22) PCT Filed: Jul. 14, 2017

(86) PCT No.: PCT/NL2017/050477
§ 371 (c)(1),
(2) Date: Jan. 14, 2019

(87) PCT Pub. No.: WO2018/012977
PCT Pub. Date: Jan. 18, 2018

(65) Prior Publication Data
US 2019/0276240 A1 Sep. 12, 2019

(30) Foreign Application Priority Data

Jul. 15, 2016 (IT) .......................... 102016000074209
Jul. 15, 2016 (NL) ...................................... 2017173

(51) Int. Cl.
*B65G 17/08* (2006.01)
*B65G 17/40* (2006.01)
(52) U.S. Cl.
CPC ............. *B65G 17/08* (2013.01); *B65G 17/40* (2013.01); *B65G 2207/12* (2013.01)
(58) Field of Classification Search
CPC ...... B65G 17/08; B65G 17/086; B65G 17/40; B65G 2207/12
See application file for complete search history.

(56) References Cited

U.S. PATENT DOCUMENTS 5,105,938 A * 4/1992 Tan .................. B65G 17/08
198/851
5,816,390 A * 10/1998 Stebnicki ............... B65G 17/08
198/853
(Continued)

FOREIGN PATENT DOCUMENTS

EP 0787664 A1 8/1997
EP 1591362 A1 11/2005
(Continued)

OTHER PUBLICATIONS

International Search Report and Written Opinion dated Oct. 25, 2017 in connection with PCT/NL2017/050477.

*Primary Examiner* — Gene O Crawford
*Assistant Examiner* — Keith R Campbell
(74) *Attorney, Agent, or Firm* — Quarles & Brady LLP

(57) ABSTRACT

A modular conveyor, comprising a plurality of modules successive in transport direction, each comprising a body part with a transport surface for transporting products thereon, which body part during use is hingedly coupled via a hinge pin to the body part of a successive module. The successive modules are adjustable from an assembly position to an operative position. In the working position the hinge pin can be introduced from outside of the body parts (Continued)

into a receiving space formed by the successive modules or can be taken out of that receiving space to outside of the body parts due to that the hinge pin is released by the body parts to move in longitudinal direction and/or transverse direction of its longitudinal axis. In the operative position the hinge pin is retained in the receiving space formed by the body parts of the successive modules due to that the movement of the hinge pin both in longitudinal direction and in transverse direction of its longitudinal axis is limited by the body parts.

29 Claims, 7 Drawing Sheets

(56) References Cited

U.S. PATENT DOCUMENTS

| | | | |
|---|---|---|---|
| 7,073,662 B2 * | 7/2006 | Neely | B65G 17/086 |
| | | | 198/850 |
| 8,720,676 B2 * | 5/2014 | Neely | B65G 17/385 |
| | | | 198/850 |

FOREIGN PATENT DOCUMENTS

| | | | | |
|---|---|---|---|---|
| EP | 1591382 | * | 11/2005 | ............ B65G 17/08 |
| EP | 2196413 A1 | | 6/2010 | |
| FR | 2846642 A1 | | 5/2004 | |
| WO | 2015108416 A1 | | 7/2015 | |

* cited by examiner

MODULAR CONVEYOR, CONVEYOR MODULE AND METHOD OF COUPLING MODULES OF A CONVEYOR

CROSS-REFERENCE TO RELATED APPLICATIONS

This application represents the national stage entry of PCT International Application No. PCT/NL2017/050477 filed on Jul. 14, 2017 and claims priority to Netherlands Patent Application No. 2017173 filed on Jul. 15, 2016 and Italian Patent Application No. 102016000074209 filed on Jul. 15, 2016, the contents of which are hereby incorporated by reference as if set forth in their entirety herein.

The invention generally relates to coupling successive modules of modular conveyors.

Modular conveyors are generally known and are used for conveying products. The modules of the conveyors are often manufactured by molding, and are usually made of a rigid material.

A customary modular conveyor comprises a plurality of modules successive in a transport direction. Each module comprises a body part with a transport surface for transporting products thereon, which body part during use is hingedly coupled via a hinge pin to the body part of a successive module.

In this manner, modules successive in the conveying direction can be joined to form a conveyor of a desired length. The conveyor is usually of endless design, so that it can circulate with a top run over a conveying track using return wheels, e.g. sprockets. Typically, the conveyor may be embodied as a modular conveyor chain or as a modular conveyor mat.

In a modular conveyor chain, transversely to the conveying direction, the modules are coupled in a single row. In the modules of a modular conveyor chain, the transport surface is typically part of a transport blade portion of the body part that extends from a rear to a front of the module, and the hinge parts are part of a hinge assembly portion of the body part located below the transport blade portion.

In a modular conveyor mat, several modules may be placed next to each other transversely to the conveying direction, and may be coupled using continuous hinge pins. Rows of modules successive in the conveying direction may then be mutually staggered transversely to the conveying direction, so that continuous slits in the conveying direction between the modules of the mat can be avoided. In the modules of a modular conveyor mat, the transport surface is typically part of transport body that extends from a rear to a front of the module, and that comprises at the front and rear a series of hinge parts with contiguous receiving spaces alternately successive transversely to the conveying direction, so that hinge parts and receiving spaces can interdigitate with receiving spaces and hinge parts of similar modules successive in the conveying direction. Successive modules can then be hingedly coupled using hinge pins extending transversely to the conveying direction, reaching through hinge holes provided in the hinge parts.

In use, the hinge pins that hingedly couple the successive modules of the modular conveyors tend to migrate along their longitudinal axis, in particular due to circulation over the return wheels. To retain the hinge pin between successive modules, the hinge pins are typically blocked against migration along their longitudinal axis by biased form locking or retaining clips.

In modular conveyor chains, typically both the modules and the hinge pins are made of a rigid material, i.e. a form-retaining material that in use under normal operating conditions substantially retains its shape. The hinge pin is commonly relatively short and stiff, and may be made from metal or rigid plastics material, while the body parts of the modules may also be made from metal or rigid plastics material, in particular engineering plastics, e.g. POM, PBT or PA. To retain the hinge pins, typically the surface of the hinge pins is locally provided with an area of non-circular cross section, or of roughened surface. Examples are hinge pins with a cylindrical body having flattened ends (so called D-pins), or with serrated or knurled ends. At manufacture, the hinge pins are then axially force-pressed into a working position, so that the material of the body portion deforms and retains the hinge pin through biased form locking along the end portions. Due to the biased form locking, he hinge pins are axially and rotationally fixed.

As the hinge pins typically are made of hardened steel, machining of the surface of the hinge pins to create a provide a local area of non-circular cross section increases costs. Also, after manufacture successive modules may due to the biased form-locking not easily be uncoupled, which presents a problem during installation, maintenance or repair of the conveyor. Further, the fixed position of the hinge pins increases wear.

In modular conveyor mats, typically the modules are made of rigid plastics material, and the hinge pins are made of long, relatively flexible plastic rods. To prevent migration of the hinge pins, the modules along the longitudinal edges of the mat are provided with retaining clips that allow a hinge pin to pass. During assembly, successive modules may be coupled by axially inserting a hinge pin between them, and adding a removable retaining clip to axially lock the hinge pin in place. Such clips have as disadvantage that they increase costs, and may become detached. In case of detachment, the hinge pins may then migrate out of engagement, and the clips may get damaged, may get lost. In case of conveying food products, detachment of the clips may even pose a risk of food contamination.

Alternative solutions have been provided in which the retaining elements are locked in place or integrally formed with the modules that are located along the longitudinal edges of the conveyor mat. Such retaining elements may during assembly of the mat be moved from a free position in which it allows the hinge pin to pass axially, to a blocking position in which it blocks axial movement of the hinge pin. Although convenient and effective, such retaining elements typically require complex molds and increase costs of manufacture. Other solutions have been provided in which the material of the hinge pins or the successive modules is, during assembly, temporarily deformed to allow a hinge pin to be placed. Such solutions, however, either require a less than optimal rigidity of the materials of the hinge pins or the modules, or do not easily allow the modules to be uncoupled.

The invention aims to provide an alternative solution for coupling of modules of modular conveyors, preferably alleviating one or more of the disadvantages of the present solutions. In particular, the invention aims to provide a cost effective solution that allows easy coupling and uncoupling of rigid modules using rigid hinge pins, without the need for separate retaining elements. Thereto, the invention provides for a modular conveyor, comprising a plurality of modules successive in a transport direction, each comprising a body part with a transport surface for transporting products thereon, which body part during use is hingedly coupled via a hinge pin to the body part of a successive module, wherein the successive modules are adjustable from an assembly position in which the hinge pin can be introduced from outside of the body parts into a receiving space formed by the successive modules or can be taken out of that receiving space to outside of the body parts due to that the hinge pin is released by the body parts to move in longitudinal direction and/or transverse direction of its longitudinal axis, to an operative position in which the hinge pin is retained in the receiving space formed by the body parts of the successive modules due to that the movement of the hinge pin both in longitudinal direction and in transverse direction of its longitudinal axis is limited by the body parts.

In other words, the invention provides for a modular conveyor, comprising a plurality of modules successive in a transport direction, each comprising a body part with a transport surface for transporting products thereon, which body part during use is hingedly coupled via a hinge pin to the body part of a successive module, wherein the successive modules are adjustable from an assembly position in which the body parts of the modules cooperate to form a receiving space that allows insertion and exit of the hinge pin, to an operative position in which the body parts of the modules cooperate to form a receiving space that retains the hinge pin.

By arranging the modules to be adjustable from an assembly position in which the body parts cooperate to allow insertion of the hinge pin into a receiving space, to an operative position in which the body parts cooperate to lock the hinge pin in the receiving space, ease of assembly is provided without need for a retaining element, or deformation of either body parts or hinge pin. In addition, the hinge pin may have a smooth, constant cylindrical cross section and can e.g. be manufactured from a steel rod without need for local flattening or serration of the surface. Also, the hinge pin need not be fixed, and may rotate and/or translate in its operative position. The cylindrical cross section prevents localized stress concentration both in the hinge pin itself, as well as in the cooperating material of the body part of the module. Further, the cylindrical cross section facilitates mounting, as the hinge pin is symmetrical about its longitudinal axis as well as back-to-front, and needs not to be inserted in a specific orientation. However, if desired the hinge pin may still be provided with a non-cylindrical shape, e.g. a conical shape, or a stepped cross section. In such case, the hinge pin may cooperate with the material of the body parts at its step in cross section.

By arranging successive modules to be adjustable vice versa between the operative position and the assembly position, both assembly and disassembly may be facilitated.

By arranging successive modules the successive modules to be adjustable from the assembly position to the operative position, and between the operative position and the assembly position, respectively, by displacement of the hinge pin transverse to its longitudinal axis relative to the body part of one or both of the successive modules, modules may e.g. be adjusted between the assembly position and the operative position by simple sliding of the hinge pin and/or the module(s).

By arranging successive modules to be adjustable between the assembly position and the operative position, and between the operative position and the assembly position, respectively, by sliding relative to each other, the modules may e.g. be adjusted between the assembly position and the operative position by simple sliding of the hinge modules.

By arranging successive modules to be adjustable between the assembly position and the operative position, and between the operative position and the assembly position, respectively, by pivoting relative to each other, the modules may e.g. be adjusted between the assembly position and the operative position by simple pivoting of the hinge modules.

By arranging the successive modules to have their transport surfaces located in a flat plane in the operative position, the modules may in a top run of an endless conveyor be supported on a flat conveying track, and be subject to tensile loading while transporting products on the transport surface.

By arranging the material of the body part that in the operative position adjoins the end faces of the hinge pin to form sidewalls of the receiving space that limit movement of the hinge pin along its longitudinal axis, it is achieved that the hinge pin may be retained axially in an elegant manner, while the module may e.g. be injection molded as an integral piece in a relatively easy manner.

By arranging the material of the body part that in the assembly position adjoins a first end face of the hinge pin to have a passage opening for a drive-out tool, access may be provided to the hinge pin to drive the hinge pin out of the retaining space, e.g. when it has become stuck.

By arranging material of the body part that in the operative position adjoins a first end face of the hinge pin to form a passage opening for a drive-out tool, and by arranging the material that in the operative position adjoins the opposite, second end face forms an elastically deformable barrier along which the hinge pin can pass by its second end face when with a drive-out tool the hinge pin is driven out via its first end face along its longitudinal axis out of the receiving space to outside of the body parts, a conveyor can be provided that may be disassembled with a simple tool.

By arranging a recess in the material of the body part that in the assembly position adjoins an end face of the hinge pin so that it leaves movement of the hinge pin along its longitudinal axis free, a conveyor can be provided that may be assembled and disassembled without a tool.

By arranging the hinge pin to have, in the assembly position, a first position within one of the hinge parts, and in the operative position to have a second position within that hinge part, in which second position the hinge pin is displaced transversely to its longitudinal axis, adjustment between the assembly position and the operative position may be facilitated.

By arranging a passable barrier between the first and the second position, the operative position may be secured. The first and/or second hinge part may thereto e.g. provided with a hinge hole which transversely to the longitudinal axis of the hinge pin has an hourglass-shaped cross section, with the constriction of the hourglass shape forming the passable barrier. The barrier may e.g. also be formed as a flexible lip forming a one-way catch.

By providing the first and/or second hinge part with a hinge hole extending in transverse direction of the body part and having a staggered centerline, in particular a centerline staggered in transport direction, another embodiment is provided in which adjustment between the assembly position and the operative position is facilitated. The hinge part with the hinge hole having the staggered centerline may e.g. comprises a hinge loop located on the outer side of the body part, having an outer hinge hole part located on a side face of the body part, with a first centerline extending transversely to the body part, which is connected with an inner hinge hole part located further away from the side face of the body part, having a second centerline which extends parallel to the first centerline.

By arranging the hinge pin within one of the hinge parts, viewed transversely to its longitudinal axis, to have the same position within that hinge part both in the assembly position and in the operative position, adjustment between the assembly position and the operative position may be facilitated further as the hinge pin may then during assembly and disassembly be moved using one of the modules.

By providing a hinge pin that has a constant cross section, in particular a circular, un-machined cross section, the costs of the hinge pin may be reduced as it may be cut from a standard cylindrical rod, and no flattened or serrated ends need to be provided. Also, the hinge pin may be inserted in any rotational orientation, and may in use be free to rotate about its axis so as to prevent concentration of stress and wear.

The invention also provides for a module for a modular conveyor, comprising a body part with a transport surface for transporting products thereon, which body part is provided at a front and rear with correspondingly formed first and second hinge parts, with which during use the module is hingedly coupled via a hinge pin to second and first hinge parts, respectively, of correspondingly formed, adjacent modules, wherein the successive modules are adjustable from an assembly position in which the body parts of the modules cooperate to form a receiving space that allows insertion and exit of the hinge pin, to an operative position in which the body parts of the modules cooperate to form a receiving space that retains the hinge pin, wherein the body part of the module is configured such that material of the body part that in the operative position adjoins the end faces of the hinge pin, forms sidewalls of the receiving space that limit movement of the hinge pin along its longitudinal axis, and wherein the material of the body part furthermore is configured such that a recess in the material of the body part, which in the assembly position adjoins an end face of the hinge pin, leaves movement of the hinge pin along its longitudinal axis or perpendicular to its longitudinal axis, free.

The invention further provides for a method for coupling modules of a modular conveyor, wherein modules successive in transport direction, each comprising a body part with a transport surface for transporting products thereon, are hingedly coupled through their body parts via a hinge pin, wherein the body parts of the successive modules are brought in an assembly position and wherein in the assembly position a hinge pin is introduced from outside of the body parts into a receiving space formed by the successive modules, and wherein the successive modules are adjusted to an operative position in which the hinge pin is retained in the receiving space by the body parts of the successive modules due to that the movement of the hinge pin both in longitudinal direction and in transverse direction of its longitudinal axis is limited by the body parts.

The above embodiments and further embodiments are recited in the claims, and are described and elucidated on the basis of non-limiting exemplary embodiments which are represented in a drawing. In the drawing:

Figure 5:
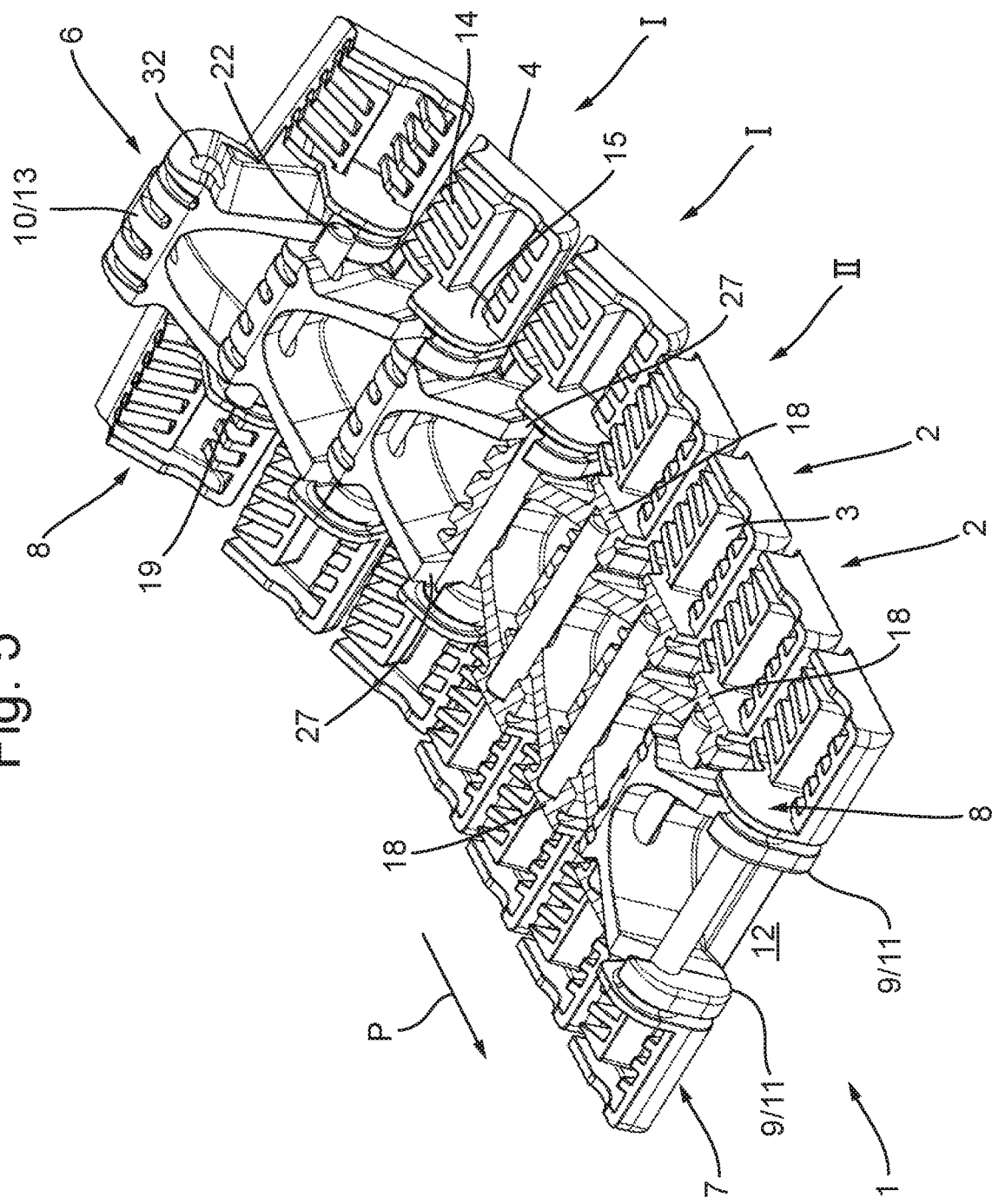
Figure 6:
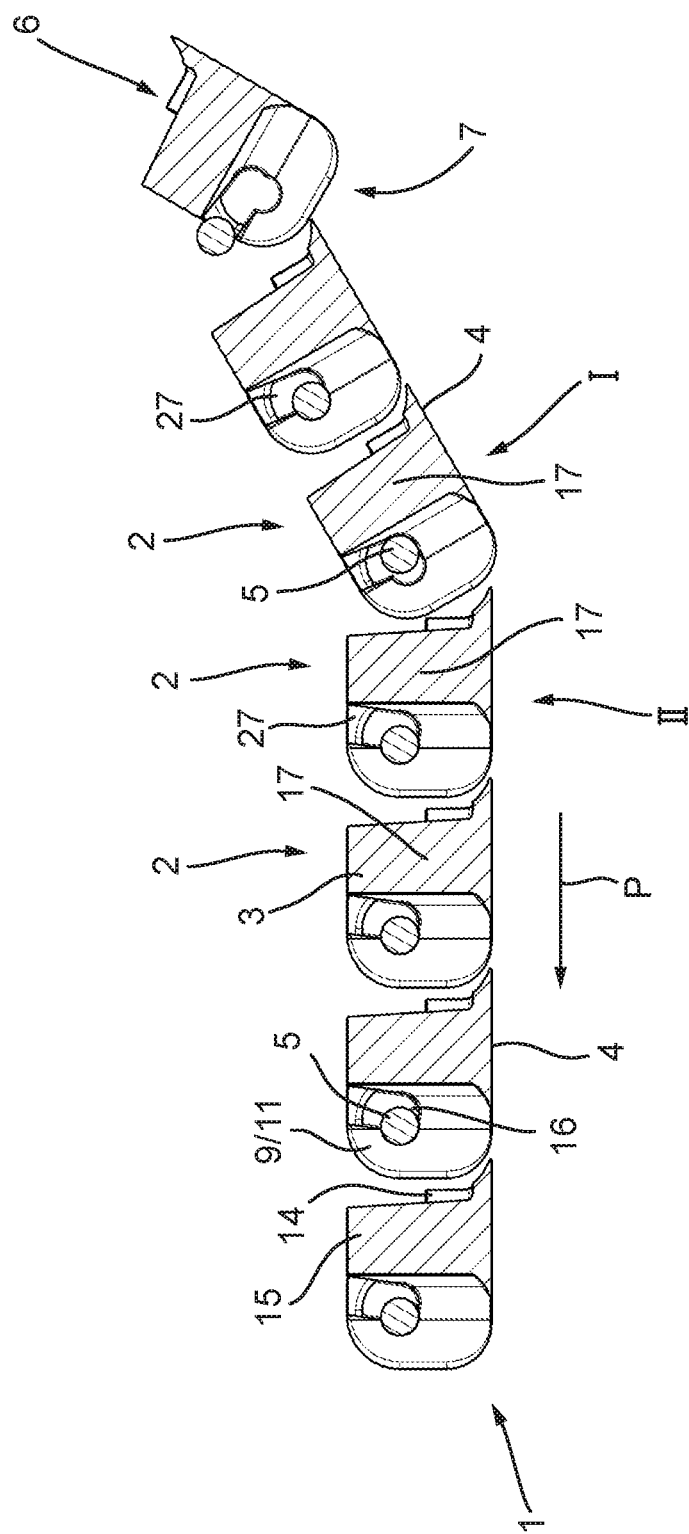
Figure 7:
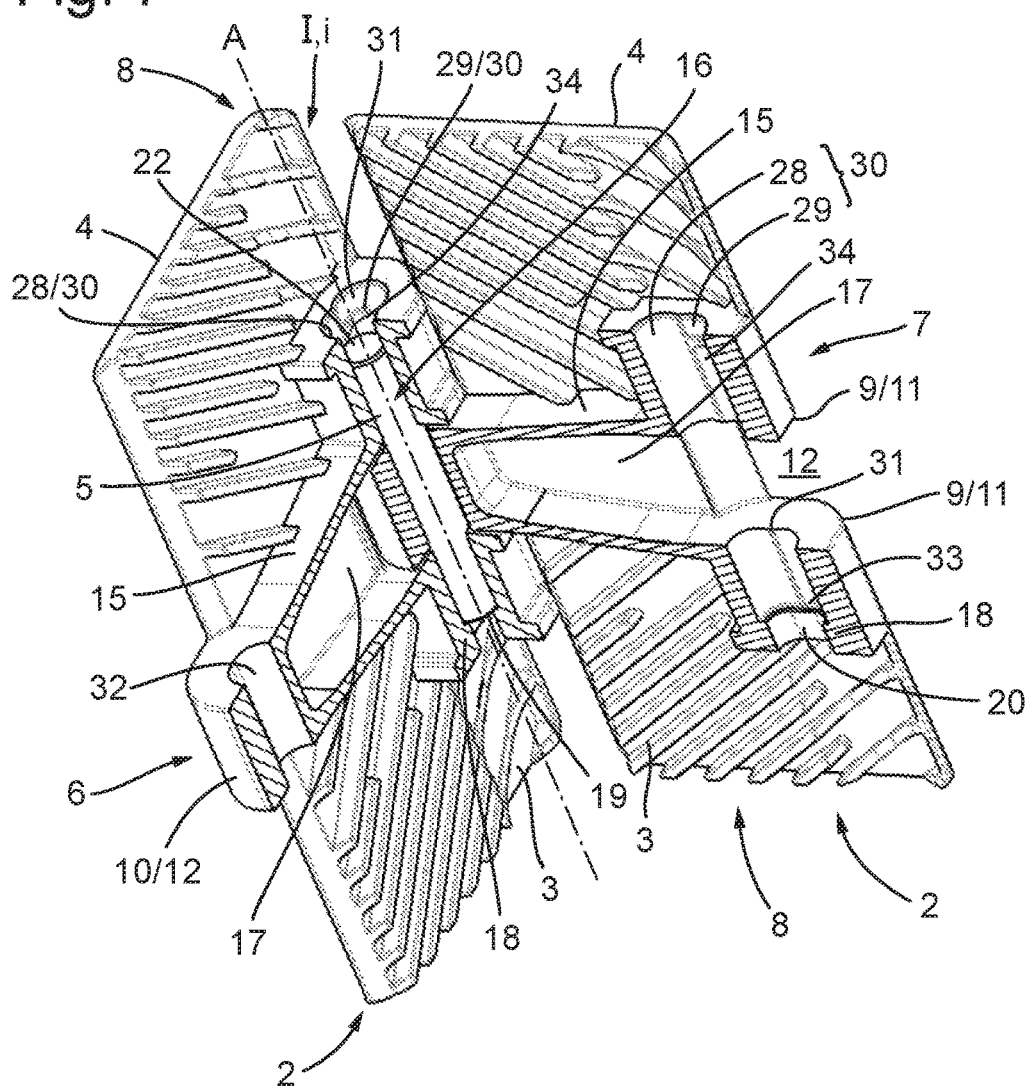
Figure 8:
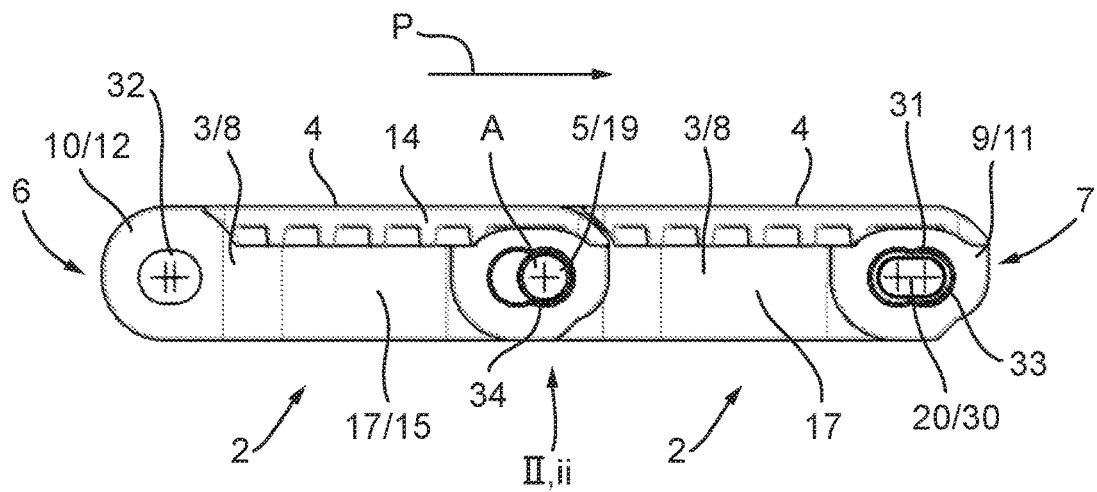

FIG. 5 shows a schematic partially cutaway perspective view of a the bottom of a string of consecutive modules forming a section of a modular conveyor in which consecutive modules are slid and rotated between an assembly position I and an operative position II, and in which the hinge pin in the assembly position is released by the body parts to move in transverse direction of its longitudinal axis, FIG. 6 shows a schematic side view in cross section of the string of modules of FIG. 5;

FIG. 7 shows a schematic partially cutaway perspective view of two consecutive modules according to a further embodiment of the invention, and FIG. 8 shows a schematic side view of a string of modules of the type shown in FIG. 7.

It should be noted that the figures are only schematic representations of preferred embodiments of the invention. In the figures, like or corresponding parts are indicated with the same reference numerals.

Figure 1:
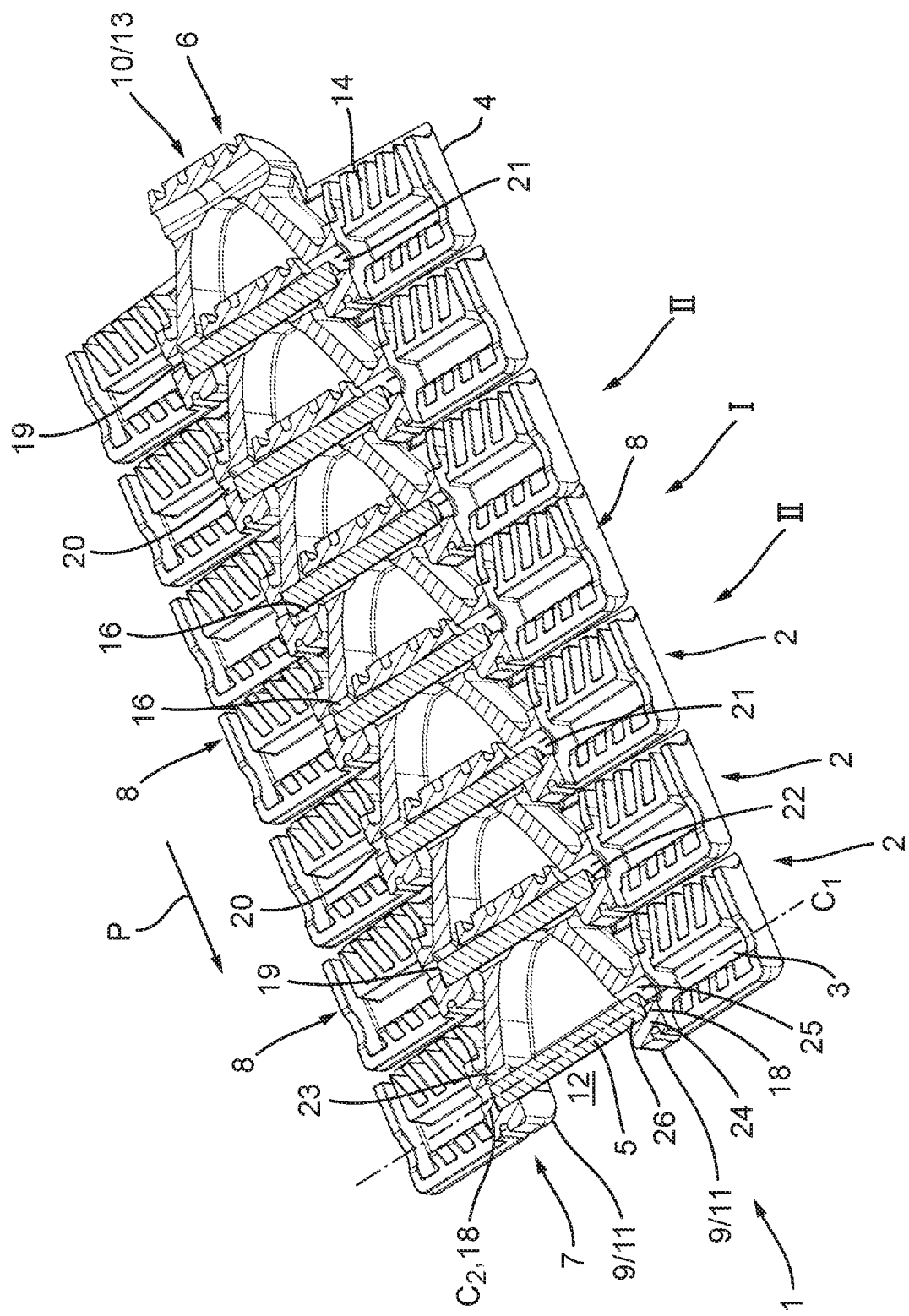
FIG. 1 shows a schematic partially cutaway perspective view of a the bottom of a string of consecutive modules forming a section of a modular conveyor in which consecutive modules are slid between an assembly position I and an operative position II, and in which in the assembly position I the hinge pin is released by the body parts to move in longitudinal direction of its longitudinal axis.
Figure 2:
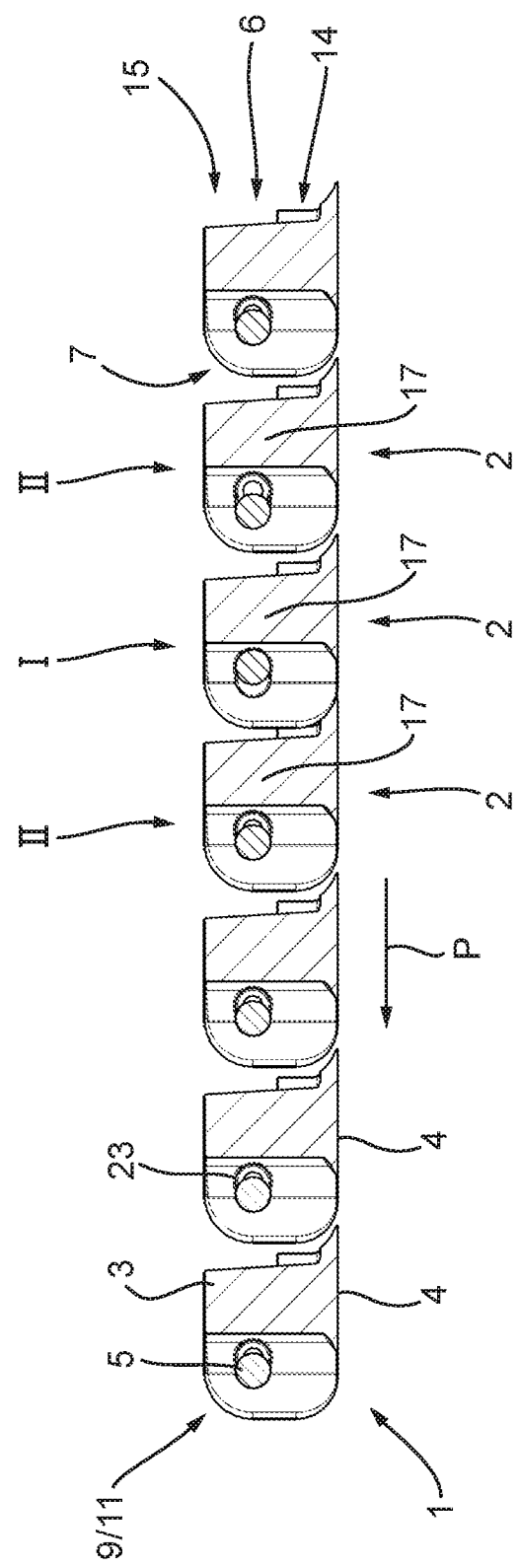
FIG. 2 shows a schematic side view in cross section of the string of modules of FIG. 1.

FIG. 1 and FIG. 2 show a section of a modular conveyor 1. The modular conveyor 1 comprises a plurality of modules 2 successive in a transport direction that is indicated by an arrow P. Each module 2 comprises a body part 3 with a transport surface 4 for transporting products thereon, e.g. bottles.

The transport surface 4 is located at a top of the body part 3, and the body part 3 extends in the transport direction P from a rear 6 to a front 7. In FIG. 1 and FIG. 2, the conveyor 1 is shown upside down so as to give a better view of the way the modules 2 are being coupled. The body part 3 is during use hingedly coupled to the body part 3 of a successive module 2 coupled via a hinge pin 5. The hinge pin 5 extends transversely to the transport direction P between side faces 8 of the body part 5.

The body part 3 comprises a first hinge part 9, which cooperates with a correspondingly formed second hinge part 10 of the successive module 2. The first hinge part 9 is located at the front 7 of the body part 3 of the module 2. The second hinge part 10 is located at the rear 6 of the body part 3 of the module 2. As shown, the successive modules 2 are each provided at a front 6 and rear 7 with correspondingly formed first hinge parts 9 and second hinge parts 10 respectively. In an alternative embodiment, successive modules 2 may be alternatingly provided with first hinge parts 9 at both front 6 and rear 7, and with second hinge parts 10 at both front 6 and rear 7. As shown, the first hinge parts 9 are each provided with two hinge loops 11 spaced apart with an interspace 12, and the second hinge parts 10 are provided with a single hinge loop 13 that extends into the interspace 12 between the two hinge loops 11 of the first hinge part 9 of the successive module 2.

As shown, the transport surface 4 is part of a transport blade portion 14 of the body part 3 that extends from the rear 6 to the front 7 of the module 2, and the first and second hinge parts 9,10 are part of a hinge assembly portion 15 of the body part 3 that is in use located below the transport blade portion 14. The modules 2 of the conveyor 1 are here embodied as chain modules, and are arranged in a single row to form a modular conveyor chain.

The successive modules 2 are adjustable from an assembly position I, to an operative position II. In FIG. 1 and FIG. 2, the both the assembly position I and the operative position II are shown. In the assembly position I the hinge pin 5 can be introduced from outside of the body parts 3 into a receiving space 16 formed by the body portions 3 of successive modules 2, or can be taken out of that receiving space 16 to outside of the body parts 3. As shown, in the assembly position I, the hinge pin 5 is released by the body parts 3 to move in longitudinal direction of its longitudinal axis A. In the operative position II, the hinge pin is retained in the receiving space 6 formed by the body parts 3 of the successive modules 2. In the operative position II, the movement of the hinge pill 5 both in longitudinal direction and in transverse direction of its longitudinal axis A is limited by the body parts 3.

Figure 3:
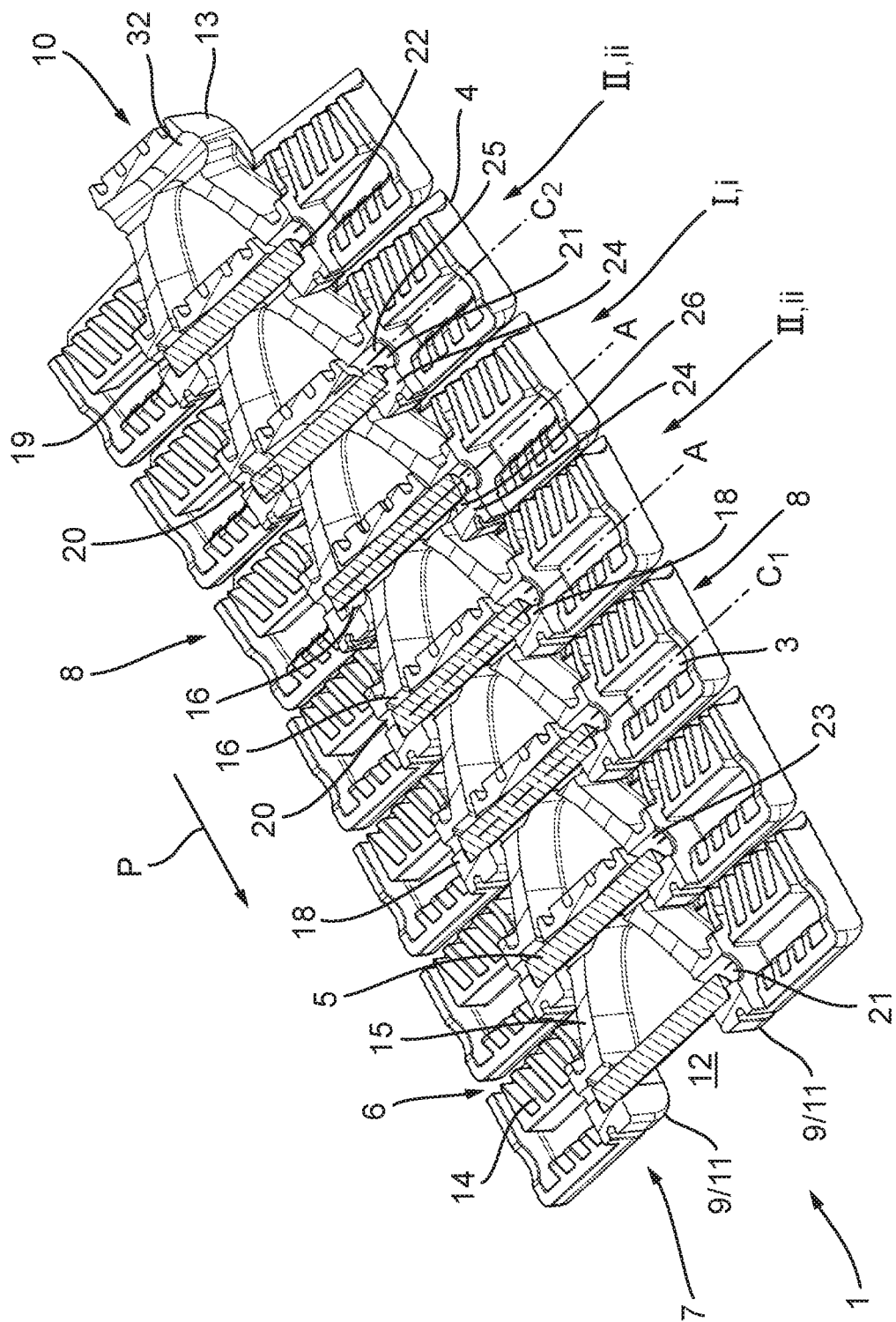
FIG. 3 shows a schematic partially cutaway perspective view of the bottom of a string of consecutive modules forming a section of a modular conveyor in which consecutive modules are rotated between an assembly position I and an operative position II, and in which in the assembly position I the hinge pin is released by the body parts to move in longitudinal direction of its longitudinal axis.
Figure 4:
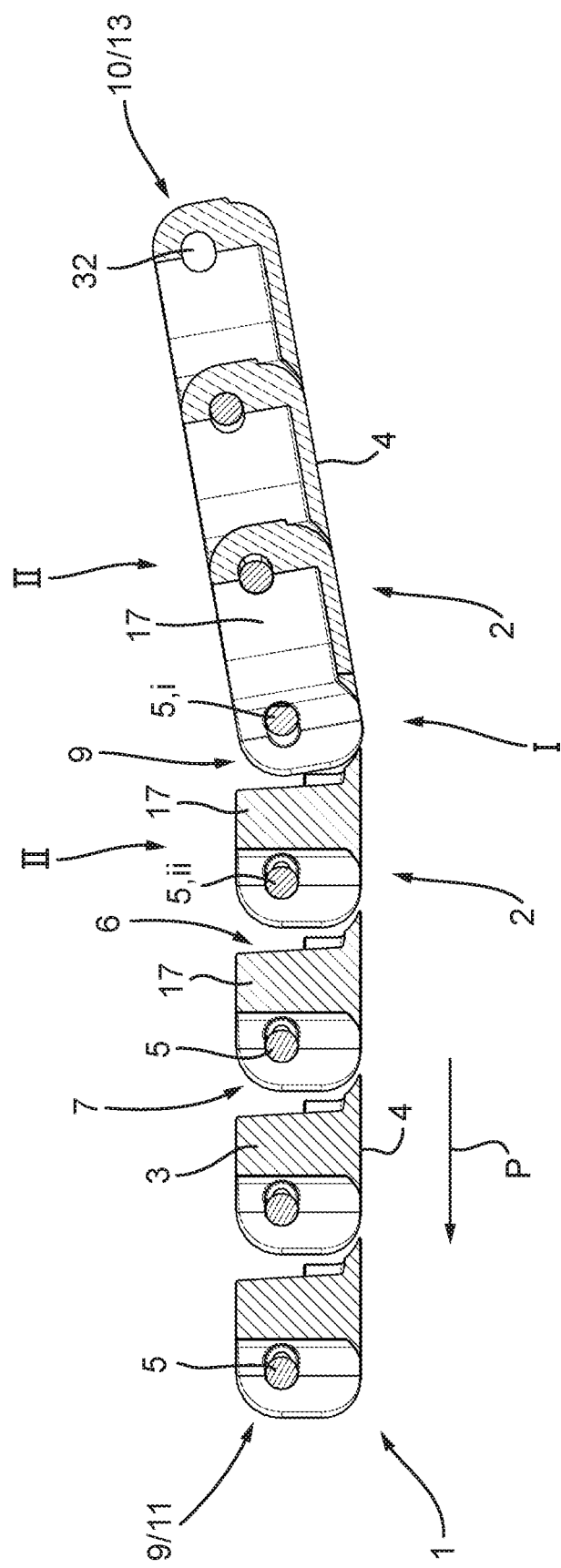
FIG. 4 shows a schematic side view in cross section of the string of modules of FIG. 3.

As shown, the successive modules 2 are adjustable between the operative position II and the assembly position I. The successive modules 2 are adjustable between the operative position II and the assembly position I by displacement of the hinge pin 5 transverse to its longitudinal axis A relative to the body part 3 of one of the successive modules 2, as well as by sliding successive modules 2 relative to each other. FIG. 3 and FIG. 4 show how successive modules 2 are adjustable between the assembly position I and the operative position II by pivoting relative to each other.

In in the operative position II, the modules 2 have their transport surfaces 4 located in a flat plane. In the operative position II, the modules 2 are typically in the top run of a conveyor, and are supported on a conveying track so that products, e.g. bottles, can be supported and transported on the transport surfaces. In the operative position, the modules are typically subject to tensile loading in transport direction P.

The centers 17 of the body parts 3 of successive modules 2 are located nearer to each other in the assembly position I than in the operative position II. The body parts 3 are in FIG. 1 and FIG. 2 in the operative position II slid into each other with greater overlap than in the assembly position I. In FIG. 3 and FIG. 4, the pivoted body parts 3 are mutually supported by resting onto each other, and the transport surfaces 4 are angled away from each other. In an alternative embodiment, the transport surfaces 4 successive modules 2 may be angled to face each other more in a so called back flexing movement.

Material of the body part 3 that in the operative position II adjoins the end faces of the hinge pin, forms sidewalls 18 of the receiving space 16 that limit movement of the hinge pin 5 along its longitudinal axis A. As shown, the hinge pin 5 has a shorter axial length than the width of the hinge assembly 15 measured transverse to conveying direction P. The material of the body part 3 that in the assembly position I adjoins a first end face 19 of the hinge pin is provided with a passage opening 20 for a drive-out tool. A recess 21 in the material of the body part 3 which in the assembly position adjoins an opposite, second end face 22 of the hinge pin, leaves movement of the hinge pin along its longitudinal axis A free so that it may pass when driven to exit the receiving space 16.

The hinge pin 5 has a constant, circular cross section and has a smooth outer surface. The hinge pin 5 is made from steel, and the body parts 3 of the modules are made from rigid plastic material such as POM, PBT or PA. In the operative position II, the hinge pin 5 may rotate about its axis A, and may have play to move along its axis A.

The hinge pin 5 has, within the second hinge part 10, and viewed transversely to its longitudinal axis A, the same position both in the assembly position I and in the operative position II. Within the first hinge part 9, the hinge pin 5 in the assembly position I has a first position i and in the operative position II has a second position ii. Between the first and second positions I, ii the hinge pin 5 is displaced transversely to its longitudinal axis A in transport direction P.

As shown, the first hinge part 9 of the module 2 is provided with a hinge hole 23 that extends in transverse direction of the body part 3, and which has a staggered centerline. As shown, the hinge hole 23 that has the staggered centerline is part of a hinge loop 24 located on the outer side of the body part. The hinge loop has an outer hinge hole part 25 located on a side edge of the body part 3, having a first centerline C1 extending transversely to the body part 3. The outer hinge hole part 25 is connected with an inner hinge hole part 26 located further inward from the side edge of the body part, and that has a second centerline C2 which extends parallel to the first centerline C1. The first hinge hole part 25 is cylindrical and its diameter corresponds with the diameter of the hinge pin 5, and the second hinge hole part 26 is an elongated slotted hole that is oversized with respect to the diameter of the hinge pin 5.

During assembly, modules 2 that are successive in transport direction P, are hingedly coupled through their body parts 3 using a hinge pin 5. The body parts 3 of the successive modules 2 are brought in the assembly position I. In the assembly position I, the hinge pin 5 is introduced from outside of the body parts 3 into the receiving space 16 formed by the successive modules 2. Next, the successive modules 2 are adjusted to an operative position in which the hinge pin 5 is retained in the receiving space 16 by the body parts 3 of the successive modules 1, due to that the movement of the hinge pin 5 both in longitudinal direction and in transverse direction of its longitudinal axis A is limited by the sidewalls 18 of the body parts 3. The material of the body parts 3 that retain the hinge pin 5 in the receiving space, in particular the sidewalls, forms part of the module 2. No separate, or separable part such as a clip is needed. Disassembly may take place by reversal of the assembly steps, and may be performed by an end user, without the need of a tool.

The modules 2 are adjusted from the assembly position I to the operative position II by displacement of the hinge pin transverse 5 to its longitudinal A axis relative to the body part 3 of one of the successive modules 2, by sliding the modules 2 away from each other (FIG. 1 and FIG. 2), or rotating the modules (FIG. 3 and FIG. 4). In the operative position II, the successive modules 2 have their transport surfaces 4 located in a flat plane, and are subject to tensile loading.

In FIG. 5 and FIG. 6, an alternative embodiment is shown, in which consecutive modules are both slid and rotated between the assembly position I and the operative position II. In this embodiment, the hinge pin 5 in the assembly position I is released by the body parts 3 via slots 27 to move in transverse direction of its longitudinal axis A in and out of the receiving space 16. During assembly, the hinge pin 5 is first introduced along its longitudinal axis A into the single hinge loop 13 of the second hinge part 10, and is then at its free ends slid into the receiving space 16 via the slots 27 in the hinge loops 24 of the first hinge parts 9. The assembly is then rotated into the operative position II, e.g. by supporting the body parts onto each other in a lever action. Disassembly may take place by reversal of the assembly steps.

Thus, a modular conveyor 1 and a module 2 therefor is disclosed, comprising a plurality of modules 2 successive in a transport direction P. Each module 2 comprises a body part with a transport surface 4 for transporting products thereon. During use, the body part 3 is hingedly coupled via a hinge pin 5 to the body part 3 of a successive module. Successive modules 2 are adjustable from an assembly position I in which the body parts 3 of the modules 2 form a receiving space 16 that allows insertion and exit of the hinge pin 5, to an operative position II in which the body parts 3 of the modules 2 form a receiving space 16 that retains the hinge pill 5.

Also, when focusing on another aspect of the invention, a modular conveyor 1 and a module 2 therefor is disclosed, comprising a plurality of modules 2 successive in a transport direction P. Each module 2 comprises a body part with a transport surface 4 for transporting products thereon. During use, the body part 3 is hingedly coupled via a hinge pin 5 to the body part 3 of a successive module. Body parts of successive modules define a receiving space 16 in which in use the hinge pin 5 is retained. In use, material of the body parts 3 forms sidewalls 18 of the receiving space 16 hat cooperates with end faces 19, 22 of the hinge pin to axially retain the hinge pin 5. In an embodiment, which is not shown in the drawings, the mounting position I and the operative position II may coincide. In this embodiment, the hinge pin is preferably cylindrical, with a constant cross section and with a smooth outer surface. The material may on one side face of the hinge pin may comprise a passage opening for a tool, and on the second side face may comprise a deformable barrier that under external axial force allows both entry and exit of the hinge pin, e.g. a deformable collar, or resilient ridge or finger. Such embodiment is specifically suitable for a rigid plastic chain module.

In FIG. 7 and FIG. 8, yet another embodiment is shown. In this embodiment, the hinge loops 11 of the first hinge part 9 are provided with two parallel, partially overlapping cylindrical hinge holes 28,29 that each have a diameter that corresponds to the diameter of the hinge pin 5. These overlapping hinge holes form a hinge hole 30 which transversely to the longitudinal axis of the hinge pin 5 has an hourglass-shaped cross section. The constriction 31 of the hourglass shape forms a passable barrier. The hinge loop 12 of the second hinge part 10 is provided with a hinge hole 32 of which the diameter corresponds to the diameter of the hinge pin 5.

During assembly, two consecutive modules may be placed a mounting position I such that the hinge hole 32 of the hinge loop 13 of the second hinge part 10 is axially aligned with the first cylindrical hinge hole 28 of the first hinge part 9. The hinge pin 5 may then be inserted into the aligned hinge holes 28,32 until the first end face 19 abuts against a stop 33. In this assembly position I, the material of the body part 3 which in the assembly position adjoins the second end face 22 of the hinge pin forms the aperture of the first cylindrical hinge hole, and leaves movement of the hinge pin 5 along its longitudinal axis A free. The hinge pin 5 may thus freely enter or exit the receiving space 16.

In the assembly position I, the hinge pin 5 has a first position i in the first hinge part 9. Next, the hinge pin 5 is displaced transversely to its longitudinal axis to a second position ii in the first hinge part 9. This may be done as follows. As the diameter of the hinge hole 32 of the hinge loop 13 of the second hinge part 12 corresponds to the diameter of the hinge pin 5, the hinge pin 5 follows movement of the module 2 that is transverse to the longitudinal axis A of the hinge pin 5.

By rotating the consecutive modules 2 until their body portions 3 are supported onto each other, the hinge pin 5 may be moved through lever action of the second hinge part 10.

In particular, the hinge pin 5 may then be displaced transversely to its longitudinal axis A to a second position ii within the first hinge part 9, in which it is located in the second cylindrical hole 29. During displacement it is forced to pass constriction 31, which after passing restricts reverse movement, and the hinge pin is this retained against movement transversely to is axis A.

The material of the body part 3 that now adjoins the first end face 19 of the hinge pin prevents movement of the hinge pin 5 along its axis A in the direction of its first end face 19. This material is provided with a passage opening 20 for a drive-out tool.

The material of the body part that now adjoins the opposite, second end face 22 forms an elastically deformable collar 34. This material prevents movement of the hinge pin 5 along its axis A toward in the direction of its second end face 22. The hinge pin 5 is now restricted in its movement both along its axis A, as well as transversely thereto, and is thus retained in the receiving space 16 in an operative position II.

For disassembly, the hinge pin 5 can be forced to pass along the deformable collar 34 by its second end face 22. Thereto, the hinge pin 5 may be driven out via its first end face along its longitudinal axis out of the receiving space to outside of the body parts using a drive-out tool.

Alternatively, the hinge pin 5 may be moved back to its first position i through rotation and/or sliding of the successive modules 2 relative to each other, so that it passes the barrier 31 and may return to the first hinge hole 28, from which it may exit axially through the entrance opening without restriction.

The invention is not limited to the exemplary embodiments represented. In particular, the modules may be configured as conveyor mat modules, and the number of hinge loops may e.g. vary. Also, the material of body portion that form the wall parts that retain the hinge pin in the receiving space may be embodied as inserts that are e.g. integrated in or integrally formed with the module. The material of the body part that cooperates with the hinge pin, in particular the wall parts, may—while being integral with the body portion—be deformable or movable. This material needs not necessarily be a non-movable part of the body portion, and the material needs not necessarily be the same throughout the body portion. Also, the hinge pins need not be cylindrical, and need not have a constant cross section. The hinge pin may e.g. have a stepped diameter, e.g. formed by a cylinder having reduced diameter end portions. Such a hinge pin may e.g. at its end portions cooperate with keyhole shaped hinge holes. Such variants will be clear to those skilled in the art, and are understood to be within the scope of the invention as set forth in the following claims.

LIST OF REFERENCE NUMERALS

1 Conveyor
2 Module
3 Body part
4 Transport surface
5 Hinge pin
6 Rear
7 Front
8 Side face
9 First hinge part
10 Second hinge part
11 Hinge loop
12 Interspace
13 Single hinge loop 14 Transport blade portion
15 Hinge assembly portion
16 Receiving space
17 Center
18 Sidewalls
19 First end face hinge pin
20 Passage opening
21 Recess
22 Second end face hinge pin
23 Hinge hole
24 Hinge loop
25 Outer hinge hole part
26 Inner hinge hole part
27 Slot
28 First hinge hole
29 Second hinge hole
30 Hour glass shaped hinge hole
31 Passable barrier
32 Hinge hole
33 Stop
34 Collar
P Transport direction
A Longitudinal axis hinge pin
C1 First longitudinal axis hinge hole part
C2 Second longitudinal axis hinge hole part
I Assembly position
II Operative position

The invention claimed is:

1. A modular conveyor, comprising:
a plurality of modules successive in a transport direction, each of the plurality of modules comprising a body part with a transport surface for transporting products thereon, the body part during use is hingedly coupled via a hinge pin to the body part of a successive module of the plurality of modules,
wherein successive modules of the plurality of modules are adjustable from an assembly position in which the body parts of the successive modules cooperate to form a receiving space that allows insertion and exit of the hinge pin, to an operative position in which the body parts of the successive modules cooperate to form a receiving space that retains the hinge pin,
wherein the body part comprises a first hinge part, which cooperates with a correspondingly formed second hinge part of the successive module,
wherein the hinge pin in the assembly position has a first position within one of the first hinge part and the second hinge part, and in the operative position the hinge pin has a second position within the one of the first hinge part and the second hinge part, in which the position of the hinge pin is displaced transversely to a longitudinal axis of the hinge pin,
wherein between the first position and the second position a passable barrier is arranged,
wherein the successive modules are rotatable until their body parts are supported onto each other to displace the hinge pin transversely to the longitudinal axis to the second position within the one of the first hinge part and the second hinge part, through lever action of the other of the first hinge part and second hinge part,
wherein during displacement the hinge pin is forced to pass the passable barrier, which after passing restricts reverse displacement, such that the hinge pin is retained against displacement transversely to the longitudinal axis.

2. The modular conveyor according to claim 1, wherein the successive modules are adjustable from the assembly position in which the hinge pin can be introduced from outside of the body parts into a receiving space formed by the successive modules or can be taken out of the receiving space to outside of the body parts due to that the hinge pin is released by the body parts to move in longitudinal direction and/or transverse direction of the longitudinal axis, to the operative position in which the hinge pin is retained in the receiving space formed by the body parts of the successive modules due to that the movement of the hinge pin both in the longitudinal direction and in the transverse direction of the longitudinal axis is limited by the body parts.

3. The modular conveyor according to claim 1, wherein the successive modules are adjustable vice versa between the operative position and the assembly position.

4. The modular conveyor according to claim 1, wherein the successive modules are adjustable between the assembly position and the operative position, or between the operative position and the assembly position, respectively, by sliding relative to each other.

5. The modular conveyor according to claim 1, wherein the successive modules in the operative position have their transport surfaces located in a flat plane.

6. The modular conveyor according to claim 1, wherein centers of the body parts of the successive modules are located nearer to each other in the assembly position than in the operative position.

7. The modular conveyor according to claim 1, wherein the successive modules are each provided at a front and a rear with the correspondingly formed first and second hinge parts.

8. The modular conveyor according to claim 7, wherein the transport surface is part of a transport blade portion of the body part that extends from a rear to a front of the module, and wherein the hinge parts are part of a hinge assembly portion of the body part located below the transport blade portion.

9. The modular conveyor according to claim 1, wherein material of the body part that in the operative position adjoins end faces of the hinge pin, forms sidewalls of the receiving space that limit movement of the hinge pin along the longitudinal axis.

10. The modular conveyor according to claim 9, wherein the material of the body part that in the assembly position adjoins a first end face of the hinge pin is provided with a passage opening for a drive-out tool.

11. The modular conveyor according to claim 9, wherein the material of the body part that in the operative position adjoins a first end face of the hinge pin is provided with a passage opening for a drive-out tool, and wherein the material that in the operative position adjoins an opposite, second end face of the hinge pin forms an elastically deformable collar along which the hinge pin can pass by the opposite, second end face when with a drive-out tool the hinge pin is driven out via the first end face along the longitudinal axis out of the receiving space to outside of the body parts.

12. The modular conveyor according to claim 1, wherein a recess in the material of the body part, which in the assembly position adjoins an end face of the hinge pin, leaves movement of the hinge pin along the longitudinal axis of the hinge pin free.

13. The modular conveyor according to claim 1, wherein the position of the hinge pin is displaced transversely to the longitudinal axis of the hinge pin in the transport direction.

14. The modular conveyor according to claim 13, wherein the first and/or second hinge part is provided with a hinge hole which transversely to the longitudinal axis of the hinge pin has an hourglass-shaped cross section, with the constriction of the hourglass shape forming the passable barrier.

15. The modular conveyor according to claim 14, wherein the first and/or second hinge part is provided with a hinge hole extending in transverse direction of the body part, having a staggered centerline.

16. The modular conveyor according to claim 15, wherein the hinge part with the hinge hole having the staggered centerline comprises a hinge loop located on the outer side of the body part, having an outer hinge hole part located on a side face of the body part, with a first centerline extending transversely to the body part, which is connected with an inner hinge hole part located further away from the side face of the body part, having a second centerline which extends parallel to the first centerline.

17. The modular conveyor according to claim 1, wherein the hinge pin within the other of the first and second hinge parts, viewed transversely to the longitudinal axis, has the same position within the other of the first and second hinge parts both in the assembly position and in the operative position.

18. The modular conveyor according to claim 1, wherein the hinge pin has a constant cross section.

19. The modular conveyor according to claim 1, wherein the hinge pin and the body parts of the modules are made of rigid material.

20. The modular conveyor according to claim 15, wherein the staggered centerline is staggered in the transport direction.

21. The modular conveyor according to claim 18, wherein the constant cross section is a circular cross section.

22. A method for coupling modules of a modular conveyor comprising:
providing modules successive in transport direction, each module comprising a body part with a transport surface for transporting products thereon and a first hinge part, which cooperates with a correspondingly formed second hinge part of the successive module, hingedly coupled through the body parts via a hinge pin, and
bringing the body parts of successive modules of the modules to an assembly position wherein the hinge pin has a first position within one of the first and second hinge parts, and
introducing in the assembly position the hinge pin from outside of the body parts when in the assembly position into a receiving space formed by the successive modules, and
adjusting the successive modules to an operative position by rotating the successive modules until their body parts are supported onto each other, wherein the hinge pin has a second position within the one of the first and second hinge parts and in which the hinge pin is retained in the receiving space by the body parts of the successive modules due to that the movement of the hinge pin both in longitudinal direction and in transverse direction of a longitudinal axis of the hinge pin is limited by the body parts,
wherein adjusting the successive modules to the operative position comprises displacement of the hinge pin transverse to the longitudinal axis relative to the body part of one or both of the successive modules, and wherein displacing the hinge pin transversely to the longitudinal axis through lever action of the other of the one of the first and second hinge parts, wherein during displacement the hinge pin is forced to pass a passable barrier arranged between the first and the second position, which after passing restricts reverse displacement, such that the hinge pin is retained against displacement transversely to the longitudinal axis.

23. The method according to claim 22, wherein displacement of the hinge pin is in the transport direction.

24. The method according to claim 22, wherein adjusting the successive modules to the operative position comprises adjusting the successive modules from the assembly position by sliding of the modules relative to each other.

25. The method according to claim 22, wherein adjusting the successive modules to the operative position comprises locating the transport surfaces in a flat plane to accommodate to tensile loading.

26. Modules for use in a modular conveying assembly, comprising:
a first module comprising a first hinge part defining a first hinge opening, wherein a constriction is defined within the first hinge opening to further define a first hinge pin position and a second hinge pin position separated by the constriction;
a second module comprising a second hinge part defining a second hinge opening; and
a hinge pin seated in the first hinge opening and the second hinge opening to pivotally couple the first module and the second module between an assembly position, at which the first module is skewed relative to the second module and the hinge pin is seated in the first hinge pin position, and an operative position, at which the first module is aligned with the second module and the hinge pin is seated in the second hinge pin position; and
wherein the first module and the second module are configured such that rotation of the first module relative to the second module from the assembly position to the operative position urges the hinge pin from the first hinge pin position past the constriction to the second hinge pin position through a lever action between the first module and the second module.

27. The modules of claim 26, wherein at least one of the first hinge part and the second hinge part is configured to impart the lever action.

28. The modules of claim 26, wherein the lever action is between the first module and the second hinge part.

29. The modules of claim 26, wherein:
the first module further comprises a first body part defining a first transport surface;
the second module further comprises a second body part defining a second transport surface;
the constriction comprises a passable barrier; and
the lever action is between the first body part and the second body part.

* * * * *

UNITED STATES PATENT AND TRADEMARK OFFICE
CERTIFICATE OF CORRECTION

PATENT NO. : 10,759,606 B2
APPLICATION NO. : 16/317767
DATED : September 1, 2020
INVENTOR(S) : Leonardus Adrianus Catharinus Cornelissen et al.

Page 1 of 1

It is certified that error appears in the above-identified patent and that said Letters Patent is hereby corrected as shown below:

In the Specification

Column 7, Line 11, "pill 5" should be --pin 5--.

Column 9, Line 9, "pill 5" should be --pin 5--.

In the Claims

Column 13, Claim 22, Line 44, "introducing in the assembly position the" should be --introducing the--.

Signed and Sealed this
Twentieth Day of October, 2020

Andrei Iancu
*Director of the United States Patent and Trademark Office*